(12) United States Patent
Torita et al.

(10) Patent No.: US 11,217,861 B2
(45) Date of Patent: Jan. 4, 2022

(54) BATTERY

(71) Applicant: TOYOTA JIDOSHA KABUSHIKI KAISHA, Toyota (JP)

(72) Inventors: Koji Torita, Nagoya (JP); Yusuke Fukumoto, Toyonaka (JP); Harunari Shimamura, Toyonaka (JP); Akihiro Ochiai, Toyonaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 15/941,111

(22) Filed: Mar. 30, 2018

(65) Prior Publication Data

US 2018/0294457 A1 Oct. 11, 2018

(30) Foreign Application Priority Data

Apr. 7, 2017 (JP) .............................. JP2017-076627

(51) Int. Cl.
*H01M 50/46* (2021.01)
*H01M 10/0525* (2010.01)
*H01M 10/0585* (2010.01)
*H01M 4/62* (2006.01)
*H01M 4/131* (2010.01)
(Continued)

(52) U.S. Cl.
CPC ........... *H01M 50/46* (2021.01); *H01M 4/131* (2013.01); *H01M 4/1391* (2013.01); *H01M 4/62* (2013.01); *H01M 10/0525* (2013.01); *H01M 10/0585* (2013.01); *H01M 50/411* (2021.01); *H01M 50/44* (2021.01); *H01M 50/449* (2021.01); *H01M 10/4235* (2013.01);
(Continued)

(58) Field of Classification Search
CPC .... H01M 50/46; H01M 50/44; H01M 50/449; H01M 50/411; H01M 2/1673; H01M 2/162; H01M 2/1653; H01M 2/1686; H01M 4/131; H01M 4/1391; H01M 4/62; H01M 10/0525; H01M 10/0585; H01M 10/4235; H01M 2004/021; H01M 2220/20; H01M 2300/004
See application file for complete search history.

(56) References Cited

U.S. PATENT DOCUMENTS

2007/0048602 A1* 3/2007 Kim .................. H01M 10/0525
429/144
2014/0134496 A1* 5/2014 Morin .................... H01M 2/162
429/247
(Continued)

FOREIGN PATENT DOCUMENTS

CN 104870156 A 8/2015
JP H10-275628 A 10/1998
(Continued)

*Primary Examiner* — Cynthia H Kelly
*Assistant Examiner* — Kirsten B Tysl
(74) *Attorney, Agent, or Firm* — Oliff PLC (57) ABSTRACT

A battery includes an electrode plate group. The electrode plate group includes electrode plates and a separator. The electrode plate group is obtained by laminating a plurality of electrode plates. The separator is disposed between the electrode plates. A surface of at least one of the electrode plates is a particle layer. A surface of the separator is a nonwoven fabric layer. The particle layer includes fibrous particles. The particle layer and the nonwoven fabric layer are in contact with each other.

12 Claims, 3 Drawing Sheets

(51) Int. Cl.
  *H01M 4/1391* (2010.01)
  *H01M 50/44* (2021.01)
  *H01M 50/411* (2021.01)
  *H01M 50/449* (2021.01)
  *H01M 10/42* (2006.01)
  *H01M 4/02* (2006.01)

(52) U.S. Cl.
  CPC .. *H01M 2004/021* (2013.01); *H01M 2220/20* (2013.01); *H01M 2300/004* (2013.01)

(56) References Cited

U.S. PATENT DOCUMENTS

| | | | |
|---|---|---|---|
| 2015/0008374 A1 | 1/2015 | Kim et al. | |
| 2016/0293943 A1* | 10/2016 | Hu | H01M 4/134 |
| 2017/0263907 A1* | 9/2017 | Ameyama | H01M 2/145 |
| 2019/0109311 A1 | 4/2019 | Shin et al. | |

FOREIGN PATENT DOCUMENTS

| | | |
|---|---|---|
| JP | 2000-149997 A | 5/2000 |
| JP | 2019-511099 A | 4/2019 |
| KR | 10-2015-0005278 A | 1/2015 |
| WO | 2014/078599 A1 | 5/2014 |
| WO | 2017/175992 A2 | 10/2017 |

* cited by examiner

FIG. 2

BATTERY

INCORPORATION BY REFERENCE

The disclosure of Japanese Patent Application No. 2017-076627 filed on Apr. 7, 2017 including the specification, drawings and abstract is incorporated herein by reference in its entirety.

BACKGROUND

1. Technical Field

The present disclosure relates to a battery.

2. Description of Related Art

Japanese Unexamined Patent Application Publication No. 2000-149997 (JP 2000-149997A) discloses a battery in which an adhesive layer is interposed between an electrode plate and a separator.

SUMMARY

In JP 2000-149997A, an electrode plate and a separator are fixed to each other by a polymer adhesive such as polyvinylidene fluoride (PVdF). As a result, prevention of a positional deviation of the electrode plate can be expected. However, the polymer adhesive may inhibit movement of charge carriers (for example, lithium ions). That is, when the polymer adhesive is used, a battery resistance may increase.

The present disclosure provides a battery in which an electrode plate and a separator can be fixed to each other without a polymer adhesive.

The technical configuration and operations and effects of the present disclosure will be described below. However, the mechanism of action of the present disclosure includes assumptions. The scope of the claims should not be regarded as being limited according to the accuracy of the mechanism of action.

The present disclosure relates to a battery including an electrode plate group. The electrode plate group includes electrode plates and a separator. The electrode plate group is obtained by laminating the plurality of electrode plates. The separator is disposed between the electrode plates. A surface of at least one of the electrode plates is a particle layer. A surface of the separator is a nonwoven fabric layer. The particle layer includes fibrous particles. The particle layer and the nonwoven fabric layer are in contact with each other.

In the above battery, the particle layer and the nonwoven fabric layer can function as a so-called "hook and loop fastener." The particle layer corresponds to a "hook" of the hook and loop fastener, and the nonwoven fabric layer corresponds to a "loop" of the hook and loop fastener. When the particle layer and the nonwoven fabric layer are brought into contact with each other, the fibrous particles and the nonwoven fabric layer are thought to become entangled. Thus, the electrode plate and the separator can be fixed to each other. The electrode plate and the separator are fixed without a polymer adhesive and thus a reduction in battery resistance can be expected.

The fibrous particles may have an average fiber length of the thickness of the particle layer or more. Thus, tips of the fibrous particles are likely to be exposed at the surface of the particle layer. As a result, the fibrous particles are likely to become entangled in the nonwoven fabric layer, and an improvement in fixing strength (peel strength) can be expected.

The fibrous particles may have an average fiber diameter of the average pore size of the nonwoven fabric layer or more. Therefore, the fibrous particles entangled in the nonwoven fabric layer are unlikely to escape. That is, an improvement of the peel strength can be expected.

The fibrous particles may have an average fiber length of the thickness of the nonwoven fabric layer or less. Thus, penetration of the fibrous particles through the nonwoven fabric layer can be prevented. When the fibrous particles do not penetrate through the nonwoven fabric layer, prevention of a voltage failure can be expected.

The fibrous particles may be at least one selected from the group consisting of silicon nitride particles, silicon carbide particles, and potassium titanate particles. Such fibrous particles have an excellent heat resistance. The particle layer including fibrous particles having an excellent heat resistance can also function as a heat resistant layer.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment (referred to as "the present embodiment" in this specification) of the present disclosure will be described below. However, the following description does not limit the scope of the appended claims. In the drawings in this specification, for convenience of explanation, the sizes are appropriately changed. The sizes in the drawings of the present disclosure do not reflect actual sizes. In this specification, for example, "at least one of A and B" includes "only A," "only B" and "both A and B."

In this specification, a lithium ion secondary battery will be described as an example of a battery. However, the lithium ion secondary battery is only an example. The battery is not limited to a lithium ion secondary battery. The battery of the present embodiment may be, for example, a nickel-hydride secondary battery, a lithium primary battery, or a sodium ion secondary battery as long as it includes an electrode plate group.

<Battery>

Figure 1:
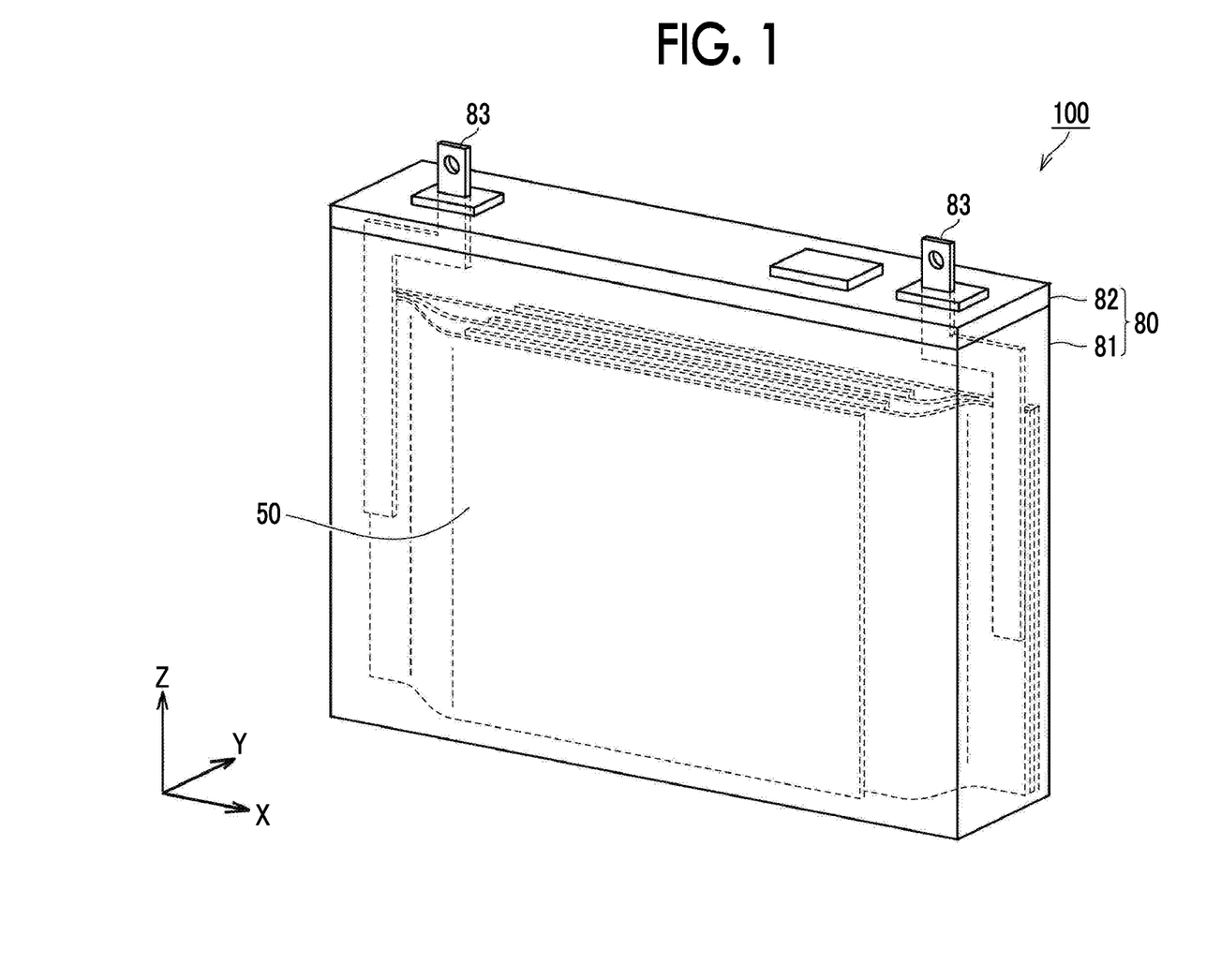
FIG. 1 is a schematic diagram showing an example of a configuration of a battery of the present embodiment.

FIG. 1 is a schematic diagram showing an example of a configuration of a battery of the present embodiment. A battery 100 includes a housing 80. The housing 80 has a rectangular shape (flat rectangular parallelepiped shape). However, the housing may have a cylindrical shape or a bag shape. The housing 80 may be made of a metal material, for example, an aluminum (Al) alloy, stainless steel (SUS), or iron (Fe). The housing may be made of, for example, a composite material of a metal material and a resin material (for example, an aluminum laminate film).

The housing 80 includes a case 81 and a lid 82. The housing 80 is sealed. The lid 82 is bonded to the case 81 by, for example, laser welding. A terminal 83 is provided in the lid 82. An injection hole, a gas discharge valve, a current interruption mechanism (CID), and the like may be provided in the housing 80. An electrode plate group 50 and an electrolytic solution (not shown) are housed in the housing 80. That is, the battery 100 includes at least the electrode plate group 50. The electrode plate group 50 is electrically connected to the terminal 83.

<Electrode Plate Group>

Figure 2:
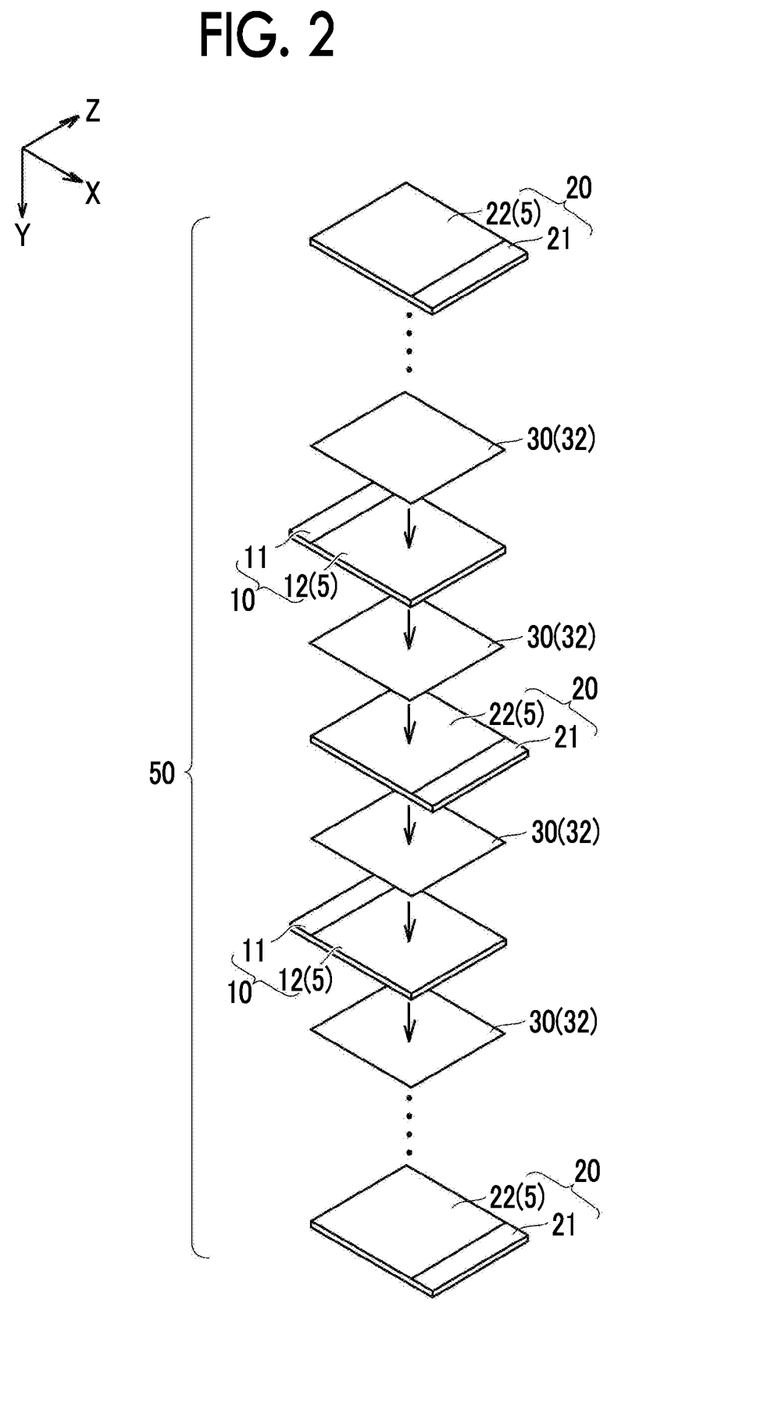
FIG. 2 is a schematic diagram showing an example of a configuration of an electrode plate group of the present embodiment.

FIG. 2 is a schematic diagram showing an example of a configuration of an electrode plate group of the present embodiment. The electrode plate group 50 includes electrode plates and separators 30. The electrode plate group 50 is obtained by laminating a plurality of electrode plates. The separator 30 is disposed between the electrode plates. Two adjacent electrode plates with the separator 30 therebetween have different polarities. That is, one of two adjacent electrode plates with the separator 30 therebetween is a positive electrode plate 10 and the other thereof is a negative electrode plate 20.

The number of electrode plates included in the electrode plate group 50 is not particularly limited as long as it is 2 or more. The number of electrode plates may be, for example, 2 to 100, 3 to 100, or 8 to 80.

Figure 3:
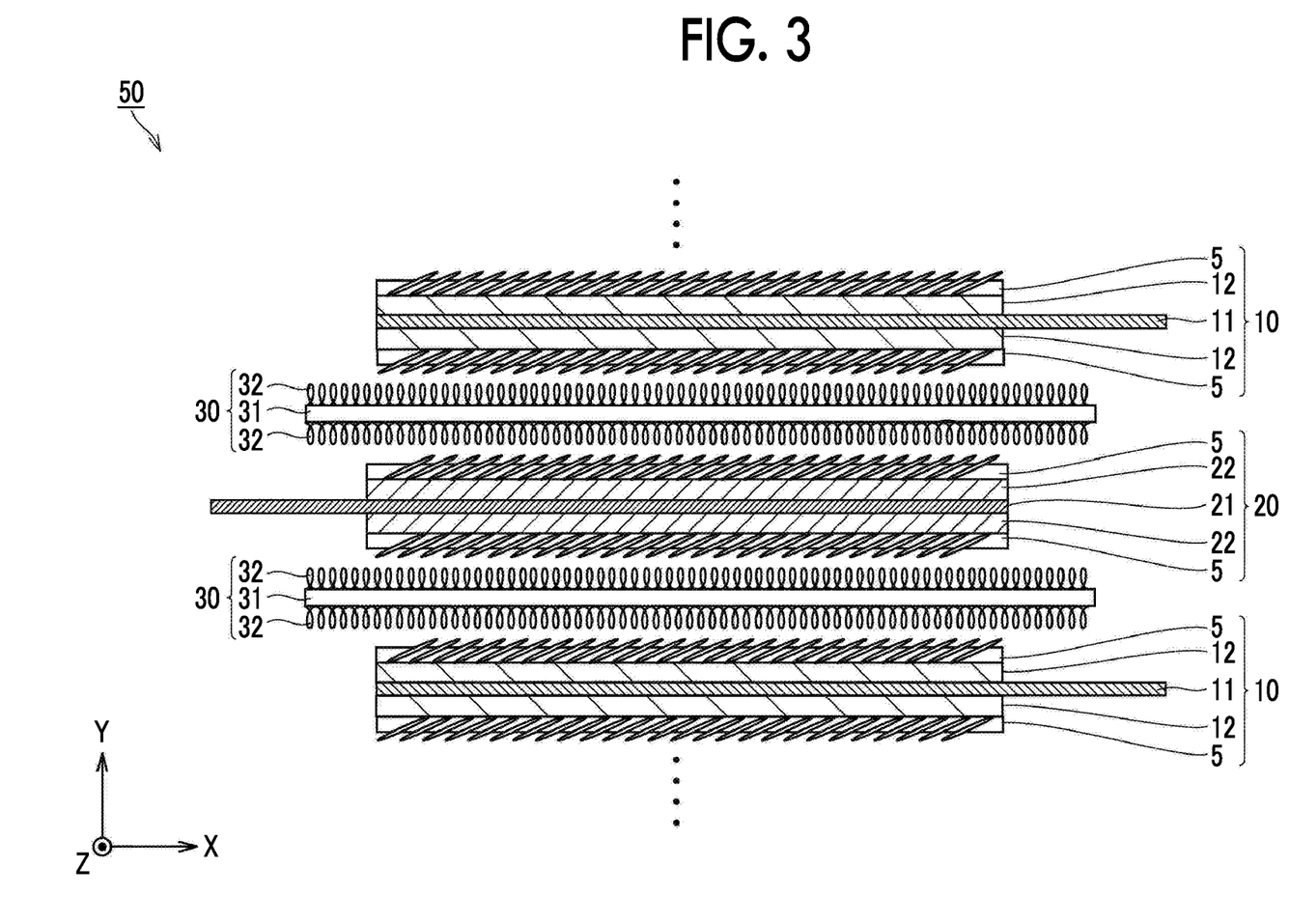
FIG. 3 is a conceptual sectional view showing an example of a configuration of the electrode plate group of the present embodiment.

FIG. 3 is a conceptual sectional view showing an example of a configuration of the electrode plate group of the present embodiment. A surface of an electrode plate, that is, at least one of the positive electrode plate 10 and the negative electrode plate 20, is a particle layer 5. The surface of the separator 30 is a nonwoven fabric layer 32. The particle layer 5 includes fibrous particles. The particle layer 5 and the nonwoven fabric layer 32 are in contact with each other. Therefore, the fibrous particles and the nonwoven fabric layer 32 are thought to become entangled in at least a part of an interface in which the particle layer 5 is in contact with the nonwoven fabric layer 32. When the fibrous particles and the nonwoven fabric layer 32 become entangled, the positive electrode plate 10 and the separator 30 can be fixed to each other. When the fibrous particles and the nonwoven fabric layer 32 become entangled, the negative electrode plate 20 and the separator 30 can be fixed to each other.

If the electrode plate and the separator 30 are not sufficiently fixed to each other, during lamination of the electrode plates, a positional deviation of the electrode plate may occur. When a positional deviation of the electrode plate occurs, electrode plates with different polarities may come in contact with each other, with a voltage failure thereby being thought to occur.

In the present embodiment, the electrode plate and the separator 30 can be fixed to each other so that a peel strength is, for example, 0.3 N/m or more. When a peel strength becomes higher, prevention of a positional deviation of the electrode plate can be expected. The peel strength between the electrode plate and the separator 30 may be, for example, 0.4 N/m or more, 0.5 N/m or more, 0.6 N/m or more, 0.7 N/m or more, or 0.8 N/m or more. The peel strength between the electrode plate and the separator 30 may be, for example, 0.9 N/m or less. The peel strength can be measured as a 90° peel strength according to "JISZ0237 (2009) Adhesive tape and adhesive sheet test method."

<Particle Layer>

The particle layer 5 can function as a hook of a hook and loop fastener. The particle layer 5 is formed on a surface of the electrode plate (at least one of the positive electrode plate 10 and the negative electrode plate 20). The particle layer 5 may be formed on only one surface of the electrode plate or formed on both surfaces of the electrode plate. The particle layer 5 may have, for example, a thickness of 2 μm or more and 7 μm or less. An improvement of the peel strength can be expected in this thickness range. The "thickness" of each component in this specification can be measured in a sectional microscope image of each component. The microscope may be an optical microscope or an electronic microscope. The thickness is measured at at least three places in the sectional microscope image. An arithmetic mean of the thicknesses at at least three places is used as a measurement result.

The particle layer includes fibrous particles. The "fibrous particles" in this specification indicate particles with an aspect ratio (=average fiber length÷average fiber diameter) of 4 or more. The average fiber length and the average fiber diameter are measured by image analysis of projected images of the particles. The average fiber length and the average fiber diameter can be measured using, for example, a flow-type particle image analyzer "FPIA-2000" (commercially available from Sysmex Corporation) or an equivalent thereof. The measurement is wet measurement (measurement is performed while particles are dispersed in a solvent). The solvent may be, for example, water. Fiber lengths and fiber diameters of at least 100 particles are measured. An arithmetic mean of at least 100 fiber lengths can be used as an average fiber length. An arithmetic mean of at least 100 fiber diameters can be used as an average fiber diameter.

The fibrous particles may have, for example, an average fiber length within a range from 0.8 times to 6 times the thickness of the particle layer 5. Thereby, an improvement of the peel strength can be expected. Further, the fibrous particles may have an average fiber length of the thickness of the particle layer 5 or more. Thus, tips of the fibrous particles are likely to be exposed at the surface of the particle layer. As a result, the fibrous particles are likely to become entangled with the nonwoven fabric layer 32, and an improvement of the peel strength can be expected. The fibrous particles may have, for example, an average fiber length of twice the thickness of the particle layer 5 or more, or an average fiber length of 3 times the thickness of the particle layer 5 or more. The fibrous particles may have, for example, an average fiber length of 5 times the thickness of the particle layer 5 or less.

The fibrous particles may have an average fiber length of the thickness of the nonwoven fabric layer 32 or less. Therefore, penetration of the fibrous particles through the nonwoven fabric layer 32 can be prevented. When the fibrous particles do not penetrate through the nonwoven fabric layer 32, prevention of a voltage failure can be expected. The fibrous particles may have, for example, an average fiber length of 0.6 times the thickness of the nonwoven fabric layer 32 or less or have an average fiber length of 0.4 times the thickness of the nonwoven fabric layer 32 or less. The fibrous particles may have, for example, an average fiber length of 0.16 times the thickness of the nonwoven fabric layer 32 or more or have an average fiber length of 0.2 times the thickness of the nonwoven fabric layer 32 or more.

The fibrous particles may have, for example, an average fiber length of 4 μm or more, an average fiber length of 5 μm or more, or an average fiber length of 10 μm or more. The fibrous particles may have, for example, an average fiber length of 30 μm or less, an average fiber length of 25 μm or less, or an average fiber length of 15 μm or less.

The fibrous particles may have, for example, an average fiber diameter within a range from 0.2 times to 2 times the average pore size of the nonwoven fabric layer 32. Therefore, an improvement of the peel strength can be expected. Further, the fibrous particles may have, for example, an average fiber diameter of the average pore size of the nonwoven fabric layer 32 or more. Therefore, the fibrous particles entangled in the nonwoven fabric layer are unlikely to escape. That is, an improvement of the peel strength can be expected. The fibrous particles may have, for example, an average fiber diameter of 0.5 µm or more or an average fiber diameter of 1 µm or more.

When the average fiber diameter is excessively large, the fibrous particles become rigid, and the fibrous particles are unlikely to become entangled in the nonwoven fabric layer 32. The fibrous particles may have, for example, an average fiber diameter of 1.5 times the average pore size of the nonwoven fabric layer 32 or less. The fibrous particles may have, for example, an average fiber diameter of 1.5 µm or less.

The fibrous particles may have, for example, an aspect ratio of 4 or more and 83.3 or less. When the aspect ratio of the fibrous particles is too large, the fibrous particles become entangled with each other and opportunities for the fibrous particles to become entangled in the nonwoven fabric layer 32 may decrease. When the aspect ratio of the fibrous particles is too small, entanglement of the fibrous particles and the nonwoven fabric layer 32 may be weakened. The fibrous particles may have, for example, an aspect ratio of 5 or more, an aspect ratio of 10 or more, or an aspect ratio of 15 or more. The fibrous particles may have, for example, an aspect ratio of 30 or less or an aspect ratio of 25 or less.

The fibrous particles preferably have an insulation property. The fibrous particles may be inorganic particles or resin particles. The resin particles may be, for example, polyimide (PI) particles. When the fibrous particles are inorganic particles, for example, an improvement in heat resistance can be expected. When the particle layer 5 includes fibrous particles having excellent heat resistance, the particle layer 5 can function as a heat resistant layer. That is, when the temperature of the battery 100 increases, even if the separator 30 melts, the particle layer 5 can be expected to prevent physical contact between the positive electrode plate 10 and the negative electrode plate 20. The fibrous particles may be at least one selected from the group consisting of, for example, silicon nitride particles, silicon carbide particles, and potassium titanate particles. These particles have excellent heat resistance.

The particle layer 5 may include other components as long as it includes fibrous particles. The particle layer 5 may further include, for example, a binder. The particle layer 5 may include, for example, fibrous particles at 80 mass % to 99 mass % with the remainder being made up of the binder. The binder is not particularly limited. The binder may be, for example, PVdF, a vinylidene fluoride-hexafluoropropylene copolymer (PVdF-HFP), polytetrafluoroethylene (PTFE), polyacrylonitrile (PAN), polyacrylic ester, polymethacrylic acid ester, a styrene-acrylic acid copolymer, an acrylic acid-acrylic ester copolymer, an ethylene-acrylic acid ester copolymer, an ethylene-vinyl acetate copolymer, styrene butadiene rubber (SBR), carboxymethyl cellulose (CMC), or polyacrylic acid (PAA). One type of binder may be used alone, or binders of two or more types may be used in combination.

<Positive Electrode Plate>

The positive electrode plate 10 is an electrode plate having positive polarity. The planar shape of the positive electrode plate 10 may be, for example, a rectangular shape. The positive electrode plate 10 typically includes a positive electrode current collector 11 and a positive electrode active material layer 12. The particle layer 5 can be formed on at least a part of a surface of the positive electrode active material layer 12. The particle layer 5 may be formed on a part of the surface of the positive electrode active material layer 12 or may be formed on the entire surface of the positive electrode active material layer 12 as long as it is in contact with the nonwoven fabric layer 32. However, when a contact area between the particle layer 5 and the nonwoven fabric layer 32 becomes wider, an improvement of the peel strength can be expected.

The positive electrode current collector 11 may have, for example, a thickness of 10 µm to 30 µm. The positive electrode current collector 11 may be, for example, an Al foil. The Al foil may be a pure Al foil or an Al alloy foil. The positive electrode plate 10 may include a part of the positive electrode current collector 11 that is exposed from the positive electrode active material layer 12 as a connection position with the terminal 83.

The positive electrode active material layer 12 is formed on a surface of the positive electrode current collector 11. The positive electrode active material layer 12 may be formed on only one surface of the positive electrode current collector 11 or both surfaces thereof. The positive electrode active material layer 12 may have, for example, a thickness of 10 µm to 200 µm.

The positive electrode active material layer 12 may include, for example, the positive electrode active material particles at 80 mass % to 98 mass %, and the conductive particles at 1 mass % to 15 mass % with the remainder being made up of the binder. The positive electrode active material particles are not particularly limited. The positive electrode active material particles may be, for example, $LiCoO_2$ particles, $LiNiO_2$ particles, $LiMnO_2$ particles, $LiNi_{1/3}Co_{1/3}Mn_{1/3}O_2$ particles, $LiNi_{0.82}Co_{0.15}Al_{0.03}O_2$ particles, or $LiFePO_4$ particles. One type of positive electrode active material particles may be used alone, and positive electrode active material particles of two or more types may be used in combination. The positive electrode active material particles may have, for example, an average particle size of 1 µm to 30 µm. The average particle size in this specification refers to a particle size at which a cumulative volume is 50% of the total volume in the particle size distribution measured by a laser diffraction scattering method.

The conductive particles are not particularly limited. The conductive particles may be, for example, acetylene black, thermal black, furnace black, vapor grown carbon fibers (VGCF), graphite, or graphene flakes. One type of conductive particles may be used alone, or conductive particles of two or more types may be used in combination. The binder is not particularly limited. The binder may be, for example, PVdF or PTFE. One type of binder may be used alone, or binders of two or more types may be used in combination.

<Negative Electrode Plate>

The negative electrode plate 20 is an electrode plate having negative polarity. The planar shape of the negative electrode plate 20 may be, for example, a rectangular shape. The negative electrode plate 20 typically includes a negative electrode current collector 21 and a negative electrode active material layer 22. The particle layer 5 may be formed on at least a part of a surface of the negative electrode active material layer 22. The particle layer 5 may be formed on a part of the surface of the negative electrode active material layer 22 or may be formed on the entire surface of the negative electrode active material layer 22 as long as it is in contact with the nonwoven fabric layer 32. However, when a contact area between the particle layer 5 and the nonwoven fabric layer 32 becomes wider, an improvement of the peel strength can be expected.

The negative electrode current collector 21 may have, for example, a thickness of 10 µm to 30 µm. The negative electrode current collector 21 may be, for example, a copper (Cu) foil. The Cu foil may be a pure Cu foil or a Cu alloy foil. The negative electrode plate 20 may include a part of the negative electrode current collector 21 that is exposed from the negative electrode active material layer 22 as a connection position with the terminal 83.

The negative electrode active material layer 22 is formed on a surface of the negative electrode current collector 21. The negative electrode active material layer 22 may be formed on only one surface of the negative electrode current collector 21 or both surfaces thereof. The negative electrode active material layer 22 may have, for example, a thickness of 10 µm to 200 µm.

The negative electrode active material layer 22 may include, for example, the negative electrode active material particles at 95 mass % to 99.5 mass %, with the remainder being made up of the binder. The negative electrode active material particles are not particularly limited. The negative electrode active material particles may be, for example, graphite particles, easily graphitizable carbon particles, non-graphitizable carbon particles, silicon particles, silicon oxide particles, tin particles, or tin oxide particles. One type of negative electrode active material particles may be used alone or negative electrode active material particles of two or more types may be used in combination. The binder is not particularly limited. The binder may be, for example, CMC or SBR. One type of binder may be used alone, or binders of two or more types may be used in combination.

<Separator>

The separator 30 has an electrically insulating property and is porous. The planar shape of the separator 30 may be, for example, a rectangular shape. The separator 30 may have, for example, a thickness of 10 µm to 50 µm. The surface of the separator 30 is the nonwoven fabric layer 32. The nonwoven fabric layer 32 can function as a loop of a hook and loop fastener.

For example, the separator 30 may be obtained by laminating the nonwoven fabric layer 32 on the surface of a substrate layer 31. The substrate layer 31 may be, for example, a porous film made of polyethylene (PE). When the substrate layer 31 is a porous film made of PE, the separator 30 can have a shutdown function. The shutdown function is a function of blocking pores in the separator 30 and restricting movement of lithium ions when the temperature of the battery 100 increases. The substrate layer 31 may have, for example, a thickness of 5 µm to 30 µm.

The separator 30 may substantially include only the nonwoven fabric layer 32. The nonwoven fabric layer 32 may have, for example, a thickness of 5 µm to 50 µm. The nonwoven fabric layer 32 is a layer composed of a nonwoven fabric. The nonwoven fabric layer 32 may be substantially composed of only a nonwoven fabric. The "nonwoven fabric" in this specification refers to a fabric-like member that is not a textile or knitted material. In the nonwoven fabric, fibers may be oriented in one direction or may be randomly oriented. The fibers can be bonded by at least one of entanglement, fusion and adhesion.

The nonwoven fabric layer 32 may be composed of, for example, synthetic fibers. The synthetic fibers may be, for example, polypropylene (PP) fibers, polyethylene terephthalate (PET) fibers, polyacrylonitrile (PAN) fibers, or polyamide (PA) fibers. One type of synthetic fibers may be used alone or synthetic fibers of two or more types may be used in combination.

The nonwoven fabric may have, for example, an average pore size of 0.5 µm or more and 5 µm or less. A high peel strength can be expected in this range. The "average pore size" in this specification refers to a pore size at which a cumulative pore volume is 50% of the total pore volume in the pore distribution measured by a mercury intrusion method. The average pore size can be measured through general mercury intrusion porosimetry or the like.

<Electrolytic Solution>

The electrolytic solution is a liquid electrolyte. The electrolytic solution includes a solvent and a supporting electrolyte. The supporting electrolyte is dissolved in the solvent. The electrolytic solution may include, for example, 0.5 mol/l to 2 mol/l of the supporting electrolyte. The supporting electrolyte may be, for example, $LiPF_6$, $LiBF_4$, $Li[N(FSO_2)_2]$, or $Li[N(CF_3SO_2)_2]$. One type of supporting electrolyte may be used alone or supporting electrolytes of two or more types may be used in combination.

The solvent may be, for example, a solvent mixture containing a cyclic carbonate and a chain carbonate. The mixing ratio may be, for example, "cyclic carbonate:chain carbonate=1:9 to 5:5" by volume ratio. Examples of the cyclic carbonate include ethylene carbonate (EC), propylene carbonate (PC), butylene carbonate (BC), and fluoroethylene carbonate (FEC). Examples of the chain carbonate include dimethyl carbonate (DMC), ethyl methyl carbonate (EMC), and diethyl carbonate (DEC). For each of the cyclic carbonate and the chain carbonate, one type thereof may be used alone or two or more types thereof may be used in combination.

The solvent may include, for example, lactone, a cyclic ether, a chain ether, and a carboxylic ester. Examples of the lactone include γ-butyrolactone (GBL) and δ-valerolactone. Examples of the cyclic ether include tetrahydrofuran (THF), 1,3-dioxolane, and 1,4-dioxane. Examples of the chain ether include 1,2-dimethoxyethane (DME). Examples of the carboxylic ester include methyl formate (MF), methyl acetate (MA), and methyl propionate (MP).

The electrolytic solution may include various functional additives in addition to the supporting electrolyte and the solvent. The electrolytic solution may include, for example, functional additives at 1 mass % to 5 mass %. Examples of the functional additive include a gas generating agent (overcharging additive) and a film forming agent. Examples of the gas generating agent include cyclohexylbenzene (CHB) and biphenyl (BP). Examples of the film forming agent include vinylene carbonate (VC), vinyl ethylene carbonate (VEC), $Li[B(C_2O_4)_2]$, $LiPO_2F_2$, propanesultone (PS), and ethylene sulfite (ES).

<Applications and the Like>

According to the present embodiment, it is possible to reduce the amount of or eliminate a polymer adhesive used to fix electrode plates of the related art. Therefore, a reduction in battery resistance can be expected. That is, the battery of the present embodiment may have a high output. The present embodiment is suitable for a laminate type battery. A laminate type battery is a battery in which no electrode plate group is wound. The laminate type battery may have a high capacity because a dead space in the housing 80 is small. That is, the battery of the present embodiment can have a high output and a high capacity.

Examples of applications for which a high output and a high capacity are required include power batteries of a hybrid vehicle (HV), a plug-in hybrid vehicle (PHV), an electric vehicle (EV), and the like. However, the battery of the present embodiment is not limited to a power battery. The battery of the present embodiment can be applied to various applications.

Examples of the present disclosure will be described below. However, the following examples do not limit the scope of the appended claims.

<Production of Battery>

Samples Nos. 1 to 23 were produced as follows. The samples Nos. 22 and 23 were comparative examples and the other samples were examples.

<Sample No. 1>

1. Production of Electrode Plate

The following materials were prepared.
Positive electrode active material particles: $LiNi_{0.82}Co_{0.15}Mn_{0.03}O_2$ particles
Conductive particles: acetylene black
Binder: PVdF
Solvent: N-methyl-2-pyrrolidone (NMP)
Positive electrode current collector: Al foil Positive electrode active material particles, conductive particles, the binder, and the solvent were mixed to prepare a positive electrode slurry. A solid content composition of the positive electrode slurry was "positive electrode active material particles:conductive particles:binder=97:1.5:1.5" by mass ratio. The positive electrode slurry was applied to surfaces (both front and back surfaces) of the positive electrode current collector by a Comma coater (registered trademark) and dried. Thus, a positive electrode active material layer was formed. The positive electrode active material layer was compressed so that a density was 3.5 g/cm$^3$. Thus, a positive electrode plate was produced. The positive electrode plate was cut to have a rectangular planar shape.

The following materials were prepared.
Negative electrode active material particles: graphite particles
Binder: CMC, SBR
Solvent: water
Negative electrode current collector: Cu foil Negative electrode active material particles, the binder, and the solvent were mixed to prepare a negative electrode slurry. A solid content composition of the negative electrode slurry was "negative electrode active material particles: CMC:SBR=98:1:1" by mass ratio. The negative electrode slurry was applied to surfaces (both front and back surfaces) of the negative electrode current collector by a Comma coater (registered trademark) and dried. Thus, a negative electrode active material layer was formed. The negative electrode active material layer was compressed so that a density was 1.6 g/cm$^3$. Thus, a negative electrode plate was produced. The negative electrode plate was cut to have a rectangular planar shape.

The following materials were prepared.
Fibrous particles:silicon nitride particles (average fiber length=4 μm, average fiber diameter=0.5 μm)
Binder: PVdF
Solvent: NMP Fibrous particles, the binder and the solvent were mixed to prepare a slurry. The slurry was applied to surfaces of a positive electrode active material layer and a negative electrode active material layer by a gravure coater and dried. Thus, a particle layer with a thickness of 5 μm was formed. As described above, electrode plates (a positive electrode plate and a negative electrode plate) including the particle layer on its surface were produced.

2. Production of Electrode Plate Group

A separator including only a nonwoven fabric layer (made of PP fibers, average pore size=1.0 μm, thickness=25 μm) was prepared. A plurality of electrode plates was laminated. The separator was disposed between the electrode plates. Thus, an electrode plate group was produced. In the electrode plate group, the total number of electrode plates was 8.

3. Production of Battery

An electrolytic solution having the following composition was prepared.
Solvent: [EC:DMC:EMC=3:4:3 (volume ratio)]
Supporting electrolyte: LiPF$_6$ (1.0 mol/l)

A terminal was connected to the electrode plate group. A bag made of an aluminum laminate film was prepared as a housing. The electrode plate group was housed in the housing. The electrolytic solution was injected into the housing. The housing was sealed. Thus, a battery (laminated type lithium ion secondary battery) was produced. The battery was designed to have a rated capacity of 800 mAh.

<Samples Nos. 2 to 15>

Batteries were produced in the same manner as in Sample No. 1 except that fibrous particles (silicon nitride particles) having an average fiber length and an average fiber diameter shown in the following Table 1 were used. Here, both the average fiber length and the average fiber diameter in the following Table 1 were values measured using a flow-type particle image analyzer "FPIA-2000" (commercially available from Sysmex Corporation).

<Samples Nos. 16 and 17>

Batteries were produced in the same manner as in Sample No. 1 except that silicon carbide particles and potassium titanate particles shown in the following Table 1 were used in place of silicon nitride particles.

<Samples Nos. 18 and 19>

Batteries were produced in the same manner as in Sample No. 1 except that nonwoven fabric layers (separators) having an average pore size shown in the following Table 1 were used.

<Samples Nos. 20 and 21>

Batteries were produced in the same manner as in Sample No. 1 except that particle layers having a thickness shown in the following Table 1 were formed.

<Sample No. 22>

A polymer adhesive (PVdF adhesive) was prepared. The polymer adhesive was applied to surfaces (both front and back surfaces) of a positive electrode plate and a negative electrode plate and dried. Thus, an adhesive layer having a thickness of 5 μm was formed. A battery was produced in the same manner as in Sample No. 1 except that electrode plates including the adhesive layer obtained in this manner were used.

<Sample No. 23>

A PVdF adhesive was applied to a surface of a nonwoven fabric layer (separator) and dried. Thus, an adhesive layer having a thickness of 5 μm was formed. A battery was produced in the same manner as in Sample No. 1 except that a separator including the adhesive layer obtained in this manner and electrode plates including no particle layer were used.

<Evaluation>

1. Peel Strength

A peel strength when the separator was peeled off from the electrode plate was measured as a 90° peel strength according to "JISZ0237 (2009) Adhesive tape and adhesive sheet test method." The results are shown in the column of "peel strength" in the following Table 1. A higher peel strength indicates that the electrode plate and the separator were fixed more strongly.

2. OCV Defect Rate 50 of each of the samples were produced. Open circuit voltages (OCV) of the batteries were measured. An average open circuit voltage of the 50 batteries was calculated. A battery having an open circuit voltage that was lower than the average open circuit voltage by 0.2 mV or more was regarded as a defective product. A defect rate was calculated by dividing the number of defective products by the total number (50). The results are shown in the column of "OCV defect rate" in the following Table 1. An OCV defect was thought to be mainly caused by a positional deviation of the electrode plate.

3. DC Resistance

A voltage of the battery was adjusted to 3.7 V. In a 25° C. environment, the battery was discharged for 10 seconds with a current of 0.8 A. A voltage drop amount was measured 10 seconds after discharging started. A DC (direct current) resistance was calculated by dividing the voltage drop amount by the current. The results are shown in the column of "DC resistance" in the following Table 1. A lower DC resistance indicates a lower battery resistance.

of the thickness of the particle layer or more. It was observed that, when the aspect ratio was low, the peel strength tended to be low (Sample Nos. 1 and 2).

It was observed that, when an average fiber diameter of fibrous particles was smaller than an average pore size of the nonwoven fabric layer, the peel strength tended to be low (Samples No. 3 and No. 12). This is thought to have been caused by the fact that fibrous particles were likely to escape from the nonwoven fabric layer. Thus, fibrous particles should have an average fiber diameter of the average pore size of the nonwoven fabric layer or more. In Sample No. 12, since the aspect ratio of fibrous particles was too large, the fibrous particles became entangled with each other, and opportunities for fibrous particles to become entangled in the nonwoven fabric layer decreased.

Sample No. 9 had a lower peel strength than the other samples. It is thought that, since the average fiber diameter was too large, fibrous particles became rigid, and the fibrous particles were unlikely to become entangled in the nonwoven fabric layer.

Sample No. 15 had a higher OCV defect rate than the other samples. It is thought that, since the average fiber length of fibrous particles exceeded the thickness of the

TABLE 1

List of samples

| | Electrode plate | | | | | | Separator | | | Evaluation | | |
|---|---|---|---|---|---|---|---|---|---|---|---|---|
| | | Particle layer/ fibrous particles | | | | | | Nonwoven fabric layer | | | | |
| | Adhesive layer PVdF | Type | Average fiber length [μm] | Average fiber diameter [μm] | Aspect ratio [—] | Thickness [μm] | Adhesive layer PVdF | Average pore size [μm] | Thickness [μm] | Peel strength [N/m] | OCV defect rate [%] | DC resistance [mΩ] |
| 1 | Without | Silicon nitride | 4 | 0.5 | 8 | 5 | Without | 1 | 25 | 0.38 | 14 | 3.56 |
| 2 | Without | Silicon nitride | 4 | 1 | 4 | 5 | Without | 1 | 25 | 0.32 | 18 | 3.55 |
| 3 | Without | Silicon nitride | 5 | 0.3 | 16.7 | 5 | Without | 1 | 25 | 0.30 | 20 | 3.64 |
| 4 | Without | Silicon nitride | 5 | 0.5 | 10 | 5 | Without | 1 | 25 | 0.51 | 6 | 3.66 |
| 5 | Without | Silicon nitride | 5 | 1 | 5 | 5 | Without | 1 | 25 | 0.70 | 4 | 3.67 |
| 6 | Without | Silicon nitride | 5 | 0.5 | 20 | 5 | Without | 1 | 25 | 0.60 | 4 | 3.71 |
| 7 | Without | Silicon nitride | 10 | 1 | 10 | 5 | Without | 1 | 25 | 0.75 | 2 | 3.72 |
| 8 | Without | Silicon nitride | 10 | 1.5 | 6.7 | 5 | Without | 1 | 25 | 0.80 | 2 | 3.72 |
| 9 | Without | Silicon nitride | 10 | 1.6 | 6.3 | 5 | Without | 1 | 25 | 0.44 | 10 | 3.75 |
| 10 | Without | Silicon nitride | 15 | 1 | 15 | 5 | Without | 1 | 25 | 0.80 | 0 | 3.79 |
| 11 | Without | Silicon nitride | 15 | 1.5 | 10 | 5 | Without | 1 | 25 | 0.85 | 0 | 3.81 |
| 12 | Without | Silicon nitride | 25 | 0.3 | 83.3 | 5 | Without | 1 | 25 | 0.33 | 12 | 3.85 |
| 13 | Without | Silicon nitride | 25 | 1 | 25 | 5 | Without | 1 | 25 | 0.88 | 0 | 3.86 |
| 14 | Without | Silicon nitride | 25 | 1.5 | 16.7 | 5 | Without | 1 | 25 | 0.90 | 0 | 3.82 |
| 15 | Without | Silicon nitride | 30 | 1 | 30 | 5 | Without | 1 | 25 | 0.80 | 30 | 3.83 |
| 16 | Without | Silicon carbide | 15 | 1 | 15 | 5 | Without | 1 | 25 | 0.78 | 2 | 3.77 |
| 17 | Without | Potassium titanate | 15 | 0.5 | 30 | 5 | Without | 1 | 25 | 0.66 | 4 | 3.76 |
| 18 | Without | Silicon nitride | 15 | 1 | 15 | 5 | Without | 0.5 | 25 | 0.77 | 2 | 3.79 |
| 19 | Without | Silicon nitride | 15 | 1 | 15 | 5 | Without | 5 | 25 | 0.52 | 6 | 3.79 |
| 20 | Without | Silicon nitride | 10 | 1 | 10 | 2 | Without | 1 | 25 | 0.70 | 2 | 3.72 |
| 21 | Without | Silicon nitride | 10 | 1 | 10 | 7 | Without | 1 | 25 | 0.80 | 2 | 3.74 |
| 22 | With (5 μm) | — | — | — | — | — | Without | 1 | 25 | 0.56 | 2 | 4.40 |
| 23 | Without | — | — | — | — | — | With (5 μm) | 1 | 25 | 0.60 | 2 | 4.25 |

<Results>

1. Average Fiber Length, Average Fiber Diameter, and Aspect Ratio

It was observed that, when the average fiber length was less than the thickness of the particle layer, the peel strength tended to be low (Samples Nos. 1 and 2). This is thought to have been caused by the fact that tips of fibrous particles were likely to be exposed at the surface of the particle layer. Thus, the fibrous particles may have an average fiber length nonwoven fabric layer, there were fibrous particles that penetrated through the nonwoven fabric layer. Thus, the fibrous particles should have an average fiber length of the thickness of the nonwoven fabric layer or less.

2. Type of Fibrous Particles

Substantially the same peel strength was obtained when fibrous particles were any of silicon nitride particles, silicon carbide particles, and potassium titanate particles (Samples Nos. 10, 16, and 17). Silicon nitride, silicon carbide, and potassium titanate have a similar Mohs hardness. Thus, if shapes of particles are similar, a similar peel strength is thought to be obtained.

3. Polymer Adhesive

Nos. 22 and 23 had a high DC resistance. This is thought to have been caused by the fact that the polymer adhesive inhibited movement of lithium ions.

The above embodiments and examples are only examples in all respects and should not be considered as restrictive. The technical scope defined by the scope of the claims includes meanings equivalent to the descriptions of the claims and all modifications within the scope of the claims.

What is claimed is:

1. A battery comprising: an electrode plate group that includes a laminate comprising: a positive electrode plate; a negative electrode plate; and a separator disposed between the positive and negative electrode plates, wherein: a surface of the positive electrode plate is a particle layer that includes fibrous particles, a surface of the separator is a nonwoven fabric layer, the fibrous particles are entangled with the nonwoven fabric layer in at least part of an interface in which the particle layer and the nonwoven fabric layer are in contact with each other, and the particle layer and the nonwoven fabric layer are configured to function as a hook and loop fastener in which the fibrous particles are aligned with each other such that the fibrous particles hook with loops in the non-woven fabric.

2. The battery according to claim 1, wherein the fibrous particles have an average fiber length of a thickness of the particle layer or more.

3. The battery according to claim 1, wherein the fibrous particles have an average fiber diameter of an average pore size of the nonwoven fabric layer or more.

4. The battery according to claim 1, wherein the fibrous particles have an average fiber length of a thickness of the nonwoven fabric layer or less.

5. The battery according to claim 1, wherein the fibrous particles are at least one selected from the group consisting of silicon nitride particles, silicon carbide particles, and potassium titanate particles.

6. The battery according to claim 1, wherein a peel strength at the interface is 0.3 N/m or more.

7. The battery according to claim 1, wherein a peel strength at the interface is 0.6 N/m or more.

8. The battery according to claim 1, wherein a peel strength at the interface is 0.8 N/m or more.

9. The battery according to claim 1, wherein the particle layer and the nonwoven fabric layer are fixed to each other at the interface without an adhesive.

10. The battery according to claim 1, wherein the fibrous particles comprise potassium titanate particles.

11. The battery according to claim 1, wherein the separator includes a substrate layer and the nonwoven fabric layer laminated on the substrate layer.

12. The battery according to claim 1, wherein the nonwoven fabric layer has an average pore size of 1 to 5 μm.

* * * * *